(12) United States Patent
Roth

(10) Patent No.: US 7,752,959 B1
(45) Date of Patent: Jul. 13, 2010

(54) KNOTTER FRAME SERVING AS LUBRICATION MANIFOLD

(75) Inventor: Darin L. Roth, Batavia, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 12/480,278

(22) Filed: Jun. 8, 2009

(51) Int. Cl.
  *B65B 13/26* (2006.01)
  *B65H 69/04* (2006.01)
(52) U.S. Cl. .................. 100/33 R; 289/11; 289/14; 184/6; 100/22
(58) Field of Classification Search ............... 100/19 R, 100/20–23, 31, 32, 33 R; 184/6; 289/2, 289/5, 8, 11, 14
  See application file for complete search history.

(56) References Cited

U.S. PATENT DOCUMENTS

| | | | | |
|---|---|---|---|---|
| 2,180,106 A | * | 11/1939 | Hammer | ....................... 56/432 |
| 4,220,362 A | * | 9/1980 | Mista | ............................ 289/2 |
| 4,817,519 A | * | 4/1989 | Brouse et al. | .................. 100/32 |
| 5,810,115 A | | 9/1998 | Mismas | |

* cited by examiner

*Primary Examiner*—Jimmy T Nguyen

(57) ABSTRACT

A knotter arrangement of a large square baler includes a plurality of knotter assemblies with each assembly including a knotter gear having a hub received on, and coupled for rotation with, a knotter drive shaft. Each assembly further includes a knotter frame including an upper end defined by a sleeve received on the gear hub. Mounted for rotation within four bores provided in the knotter frame are a worm gear spindle, a twine disk spindle, a billhook spindle and a knife arm shaft. A lubrication system includes a primary distribution manifold coupled between a lubrication pump and a plurality of lubrication delivery lines respectively leading to an inlet passage provided in each of the plurality of knotter frames, the inlet passage leading to a lubricant distribution valve mounted to the knotter frame and being operable for serially coupling the inlet passage to a plurality of lubricant distribution passages provided in the knotter frame and being coupled to respective lubrication points either directly by internal passages or indirectly by way of lubricant distribution lines extending exteriorly of the knotter frame.

5 Claims, 6 Drawing Sheets

US 7,752,959 B1

KNOTTER FRAME SERVING AS LUBRICATION MANIFOLD

FIELD OF THE INVENTION

The present invention relates to knotters for large square balers, and more particularly relates to a lubrication arrangement for such knotters.

BACKGROUND OF THE INVENTION

Modern large square balers require lubrication of five rotating elements (hub, billhook, twine disk, twine disk pinion and wiper arm) of each knotter arrangement. A grease zerk or lubricating line is provided externally of the knotter frame for introducing lubricant to each of the joints defined between a given element and the knotter frame. In order to reduce the maintenance effort, it is known to provide a distributing valve to move lubrication to each of the joints through individual lubrication lines. This arrangement suffers from the disadvantage of requiring a multitude of lube lines some of which may become kinked as the knotter is rotated to a service position, and each lube line being associated with connections which may leak.

The problem to be solved then is that of providing a knotter lubrication system which overcomes the aforementioned drawbacks of the prior art systems.

SUMMARY OF THE INVENTION

According to the present invention, there is provided an improved knotter lubrication system.

An object of the invention is to provide a knotter lubrication system which minimizes the number of lubrication lines, and hence, the number of connections which are subject to leakage.

The above object is achieved by a lubrication system which employs the knotter frame as a lubrication manifold for distributing lubrication to the joints of various rotating knotter elements mounted to the knotter frame.

The foregoing and other objects of the invention will be apparent from a reading of the ensuing description together with the appended drawings.

DESCRIPTION OF THE PREFERRED EMBODIMENT

Figure 1:
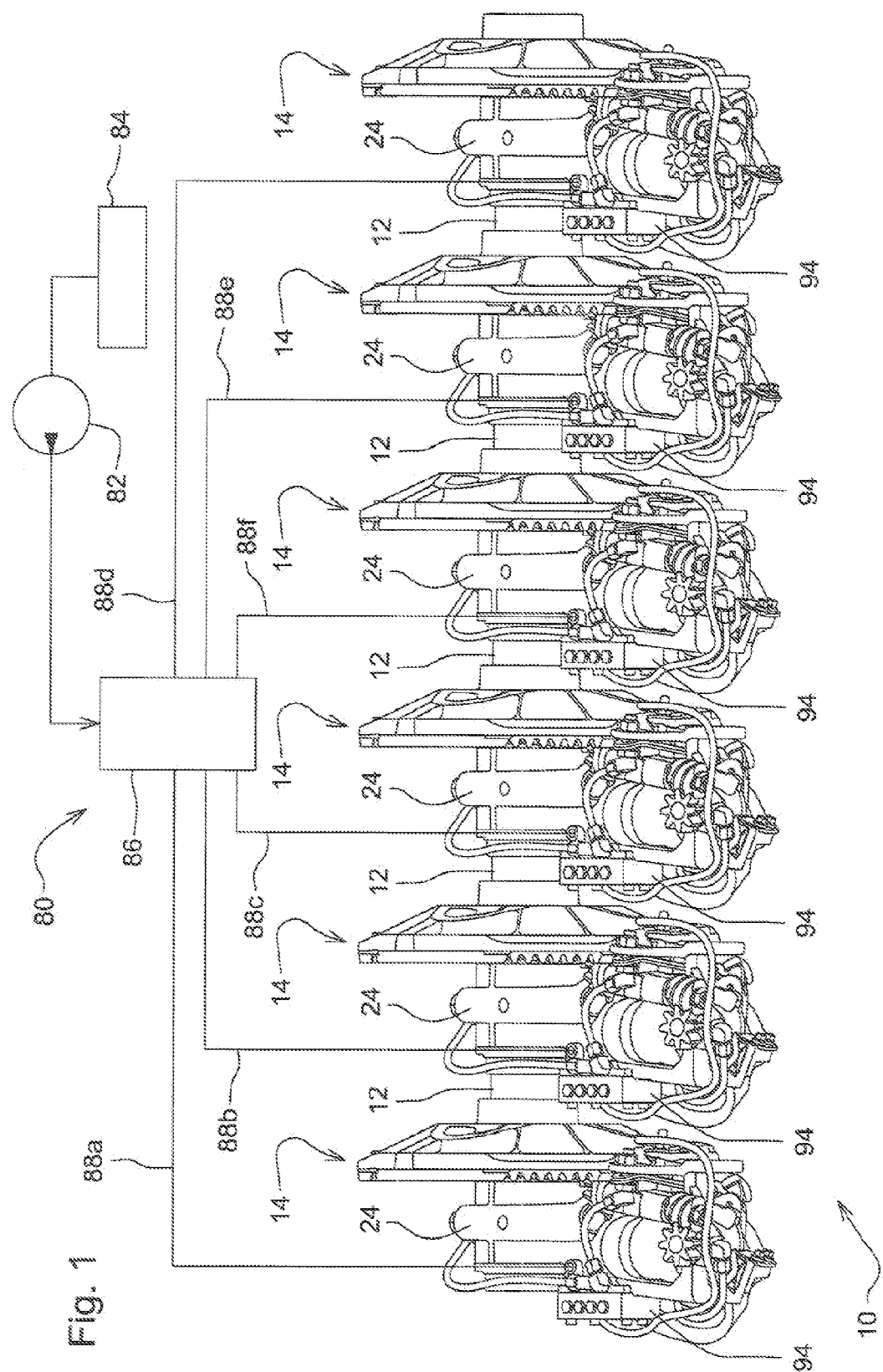
FIG. 1 is a rear view of a plurality of baler knotter assemblies together with a lubrication system constructed in accordance with the principles of the present invention.

Referring now to FIG. 1, there is shown a portion of a knotter arrangement 10 for a large square baler including a knotter drive shaft 12 supported at its opposite, ends, in a manner not shown, for rotation about a horizontal transverse axis. Six identical knotter assemblies 14 are mounted at equally spaced locations along the shaft 12.

Figure 2:
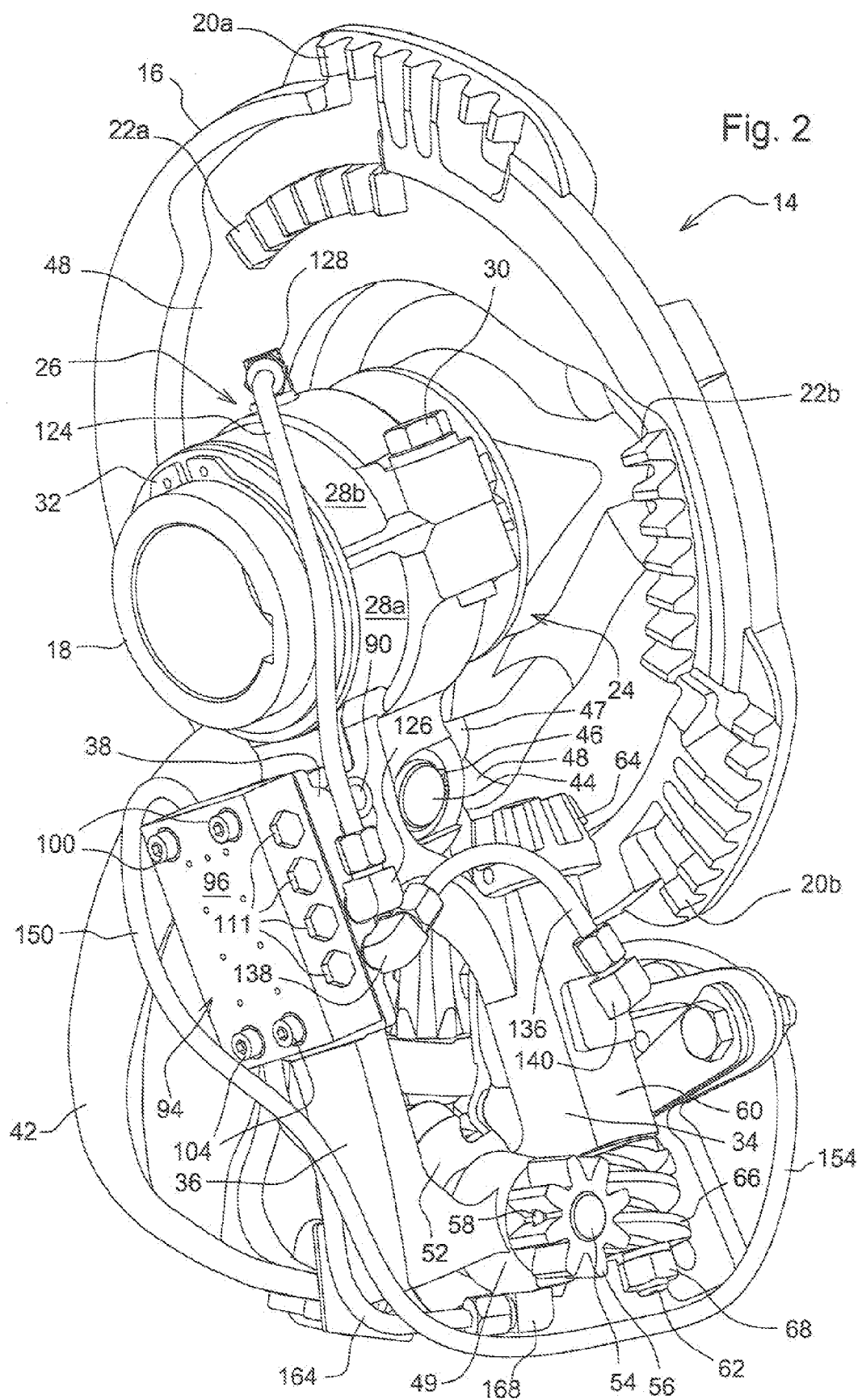
FIG. 2 is a perspective, left side view of one of the knotter assemblies shown in FIG. 1.
Figure 3:
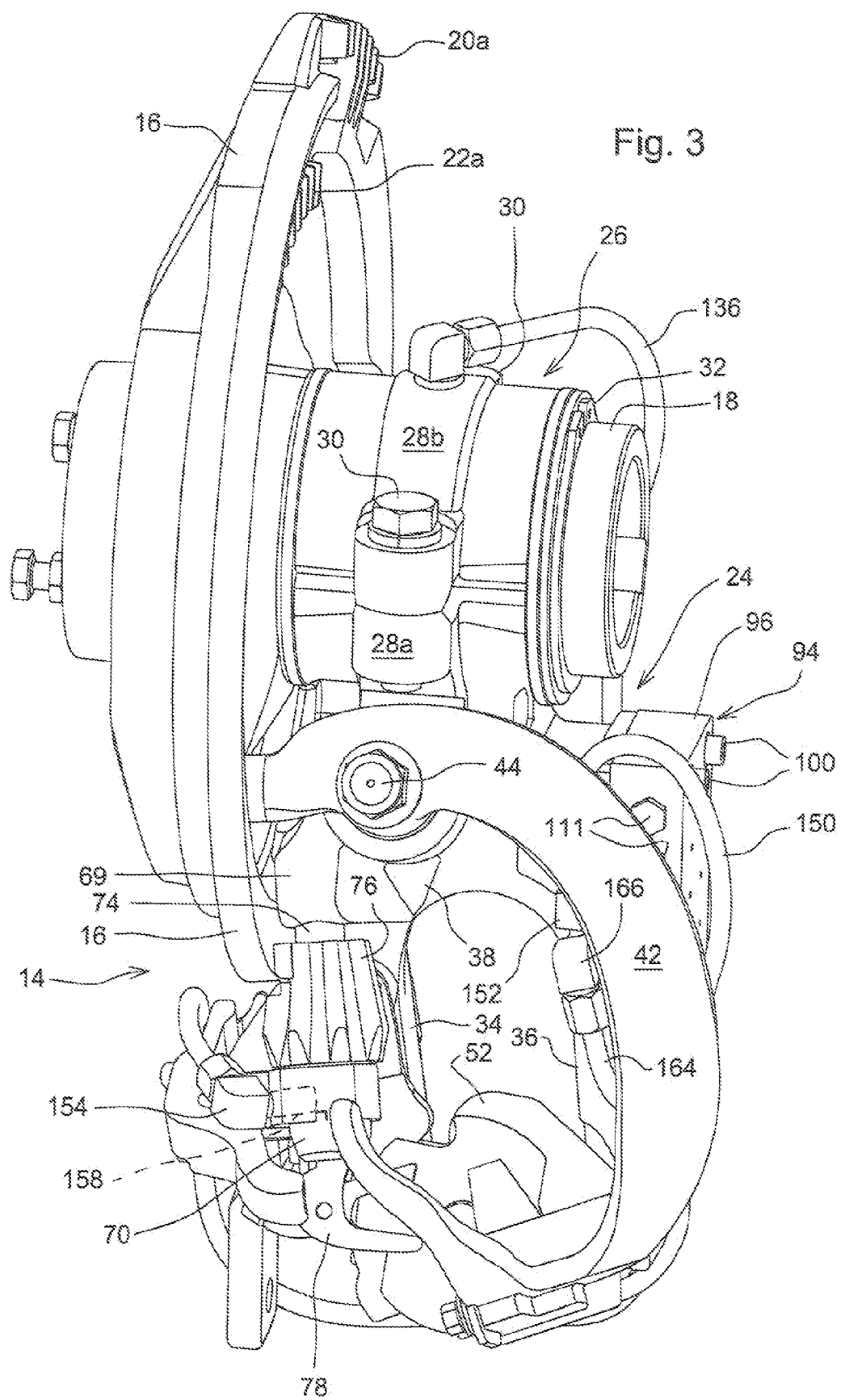
FIG. 3 is a left front perspective view of the knotter assembly shown in FIG. 2.

Referring now also to FIGS. 2 and 3, it can be seen that each knotter assembly 14 includes a drive gear 16 having an integral, leftwardly projecting cylindrical hub 18 received on, and keyed for rotation with, the drive shaft 12. The drive gear 16 further includes a pair of radially outer, annularly spaced gear tooth segments 20a and 20b, and a pair or radially inner, annularly spaced gear tooth segments 22a and 22b, respectively, having a purpose explained below.

Each knotter assembly 14 further includes a knotter frame 24 having an upper end defined by a cylindrical sleeve 26 received about the knotter gear hub 18 so as to permit the hub to rotate relative to the sleeve. A major portion of the frame 24 comprises a one-piece casting including an upper end defining a lower half 28a of the sleeve 26 and to which an upper half 28b of the sleeve is secured by a pair of bolts 30 projecting downwardly through holes provided in a first pair of lugs provided at opposite sides of the upper sleeve half 28b and being threaded into respective holes provided in a second pair of lugs provided at opposite sides of the lower sleeve half 28a. The sleeve 26 is captured between a shoulder provided on the gear 14 about the hub 18 and a snap ring 32 received in an annular ring groove provided in the hub 18.

Joined between the lower sleeve half 28a and right and left legs 34 and 36, respectively, of the frame 24 is a middle frame section 38 containing a bore 40 (see FIGS. 4 and 5), which as viewed in FIGS. 1 and 2, is disposed along an upwardly and rearwardly inclined axis which extends perpendicular to the axis of the hub 18. A knife arm 42 is joined to a knife arm shaft 44 which projects rearwardly through, and is mounted for pivoting within the bore 40. The shaft 44 is held in place by a snap ring 46 received in an annular snap ring groove provided in a rear end region of the shaft 44. As viewed in FIG. 2, the knife arm 42 extends rightwardly beyond the shaft 44 and terminates at stub shaft carrying a roller 47 engaged with a cam surface 48 formed on the gear 16.

The knotter frame 24 further includes a cylindrical ring 49 located between and joined to lower end regions of the legs 34 and 36, the ring 49 containing a bore 50 (see FIG. 7) having the same orientation as the bore 40. A twine disk 52 is fixed to a forward end region of a drive spindle 54 projecting rearwardly through, and being mounted for rotation within, the bore 50. A gear 56 is received on a rear end region of the spindle 54 and is retained there by a cross pin 58 received in aligned bores provided in the gear 56 and spindle 54. The right leg 34 includes a rearwardly offset region 60 which extends along the leg from the middle section 38 to a location approximately at a level equal to that of a top of the ring 48. Extending lengthwise through the offset leg region 60 is an upright bore 61 (FIG. 4) disposed along an axis extending perpendicular to the axis of the bore 50. A worm gear spindle 62 extends through, and is mounted for rotation within the bore 61 and has a gear 64 fixed to its upper end and located for meshing with the inner gear segments 22a and 22b, and has a worm gear 66 secured to its lower end by a nut 68 threaded onto a threaded lower end region of the spindle 62, with the worm gear 66 being meshed with the twine disk spindle gear 56.

As can be seen in FIG. 3, the middle section 38 of the frame 24 includes a forwardly projecting region 69 spaced vertically above a forwardly projecting region 70 of the leg 34. The regions 69 and 70 respectively contain axially aligned upper and lower sections 71 and 72 (see FIG. 5) of an upright bore in which is located a billhook spindle 74 having a drive gear 76 mounted thereon in the space between the frame regions 69 and 70 and being positioned for engagement by the outer gear segments 20a and 20b of the gear 16. Mounted to a lower end of the spindle 74 is a billhook 78.

Up to this point, what has been described is substantially that which is known in the prior art.

The present invention relates to a lubrication system 80 (FIG. 1) including a pump 82, which is preferably a fixed displacement gear pump, having an inlet coupled to a lubricant source 84 and an outlet coupled to a lubricant distribution manifold block 86 which divides the flow equally among six fluid lines 88a-88f, respectively. Each of the fluid lines 88a-88f is coupled to a lubricant inlet passage 90 provided in a respective one of the knotter frames 24, with each inlet passage 90 (FIGS. 2 and 4) being defined by a blind bore extending forwardly from a rear end spaced to the left of, and slightly above the height of, the bore 40 (see FIG. 4). While not shown, a T-fitting could be provided at each inlet passage 90 with the stem of the T being coupled to the passage 90, and with opposite ends of the head of the T being respectively coupled to one of the lubricant distribution lines 88a-88f and with a grease zerk, the latter being operable for being coupled directly to a grease gun for supplying lubricant to a given knotter frame 24 as may be desirable in the event that one of the rotating parts supported by the knotter frame has been replaced and needs lubricant before being put into service.

Figure 4:
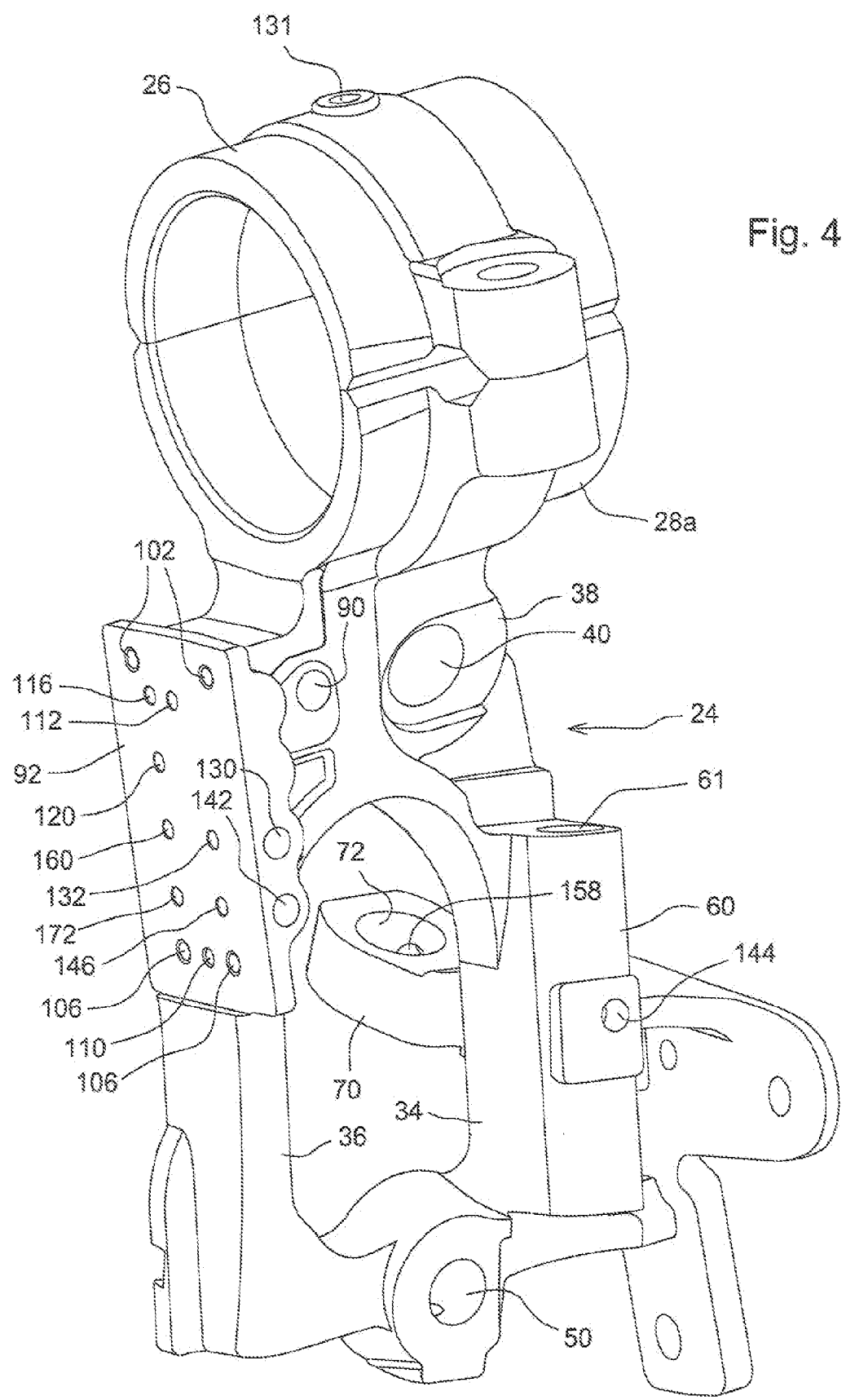
FIG. 4 is a left rear perspective view of a central region of the knotter frame showing an inlet passage leading to, and outlet passages leading from the mounting face for the lubricant distribution valve.
Figure 5:
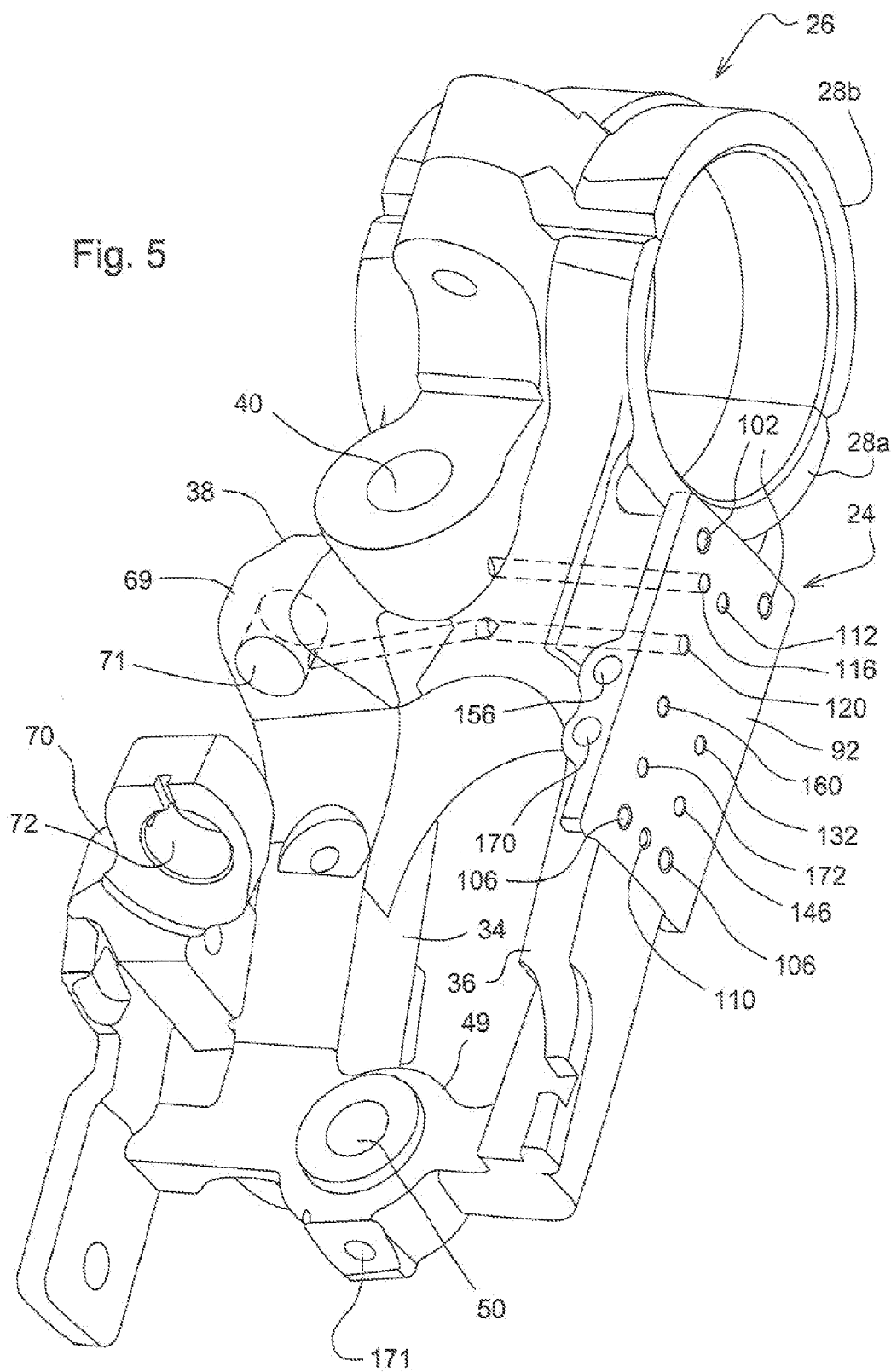
FIG. 5 is a left front perspective view of a major portion of the knotter frame showing the mounting face for the lubricant distribution valve, and in dotted lines respectively showing two internal passages having first ends at the mounting face and second ends respectively at the bore for receiving the knife arm shaft and at the upper section of the bore for receiving the bill hook spindle.
Figure 6:
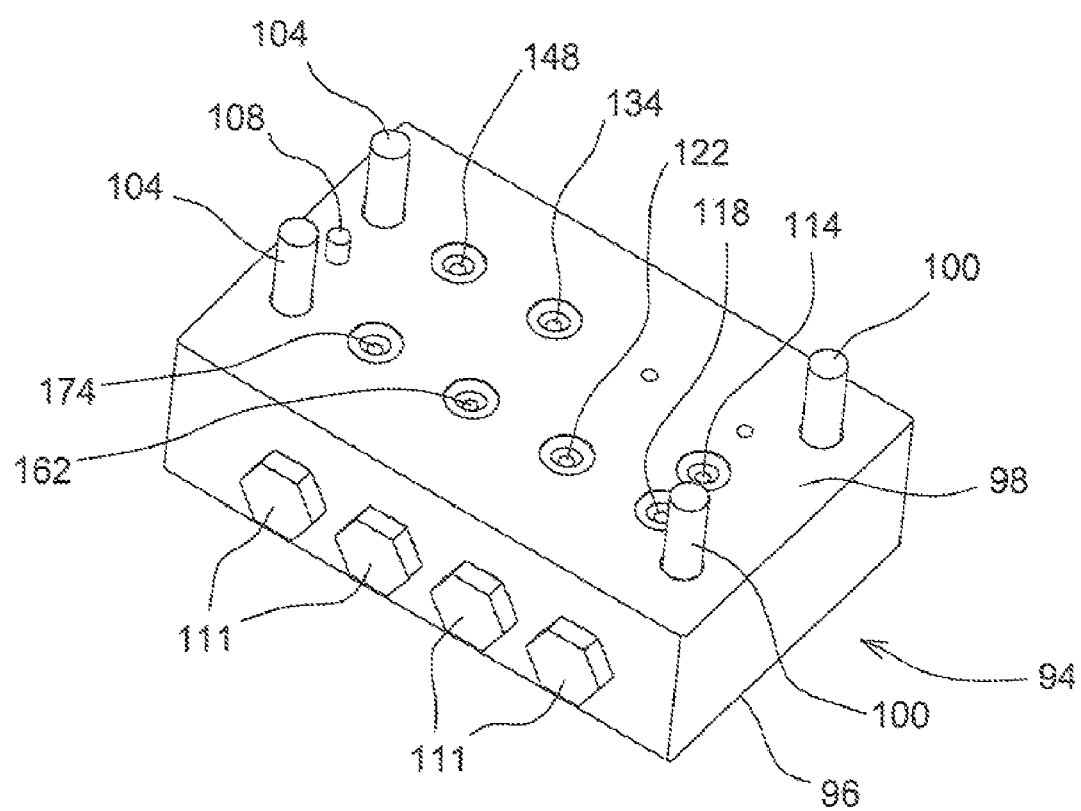
FIG. 6 is a perspective view of the progressive lubricant distribution valve showing its mounting face containing lubricant inlet and outlet passages for being placed in register with corresponding passages located at the corresponding mounting face provided at the left side of the knotter frame.

The middle section 38 and upper part of the left leg 36 of the knotter frame 24 are jointly provided with a substantially vertical, leftwardly facing flat rectangular mounting face 92 (see FIGS. 4 and 5). A lubricant distribution valve 94 (see FIGS. 2 and 6) includes a valve body 96 which is rectangular in cross section and has a planar mounting face 98 shaped complimentary to, and clamped against, the mounting face 92 of the knotter frame 24 by an upper pair of mounting bolts 100 extending through respective holes provided in upper corner regions of the valve body 96 and threaded into holes 102 provided in the mounting face 92, and by a lower pair of mounting bolts 104 extending through respective holes provided in a lower region of the valve body 96 and threaded into holes 106 provided in a lower region of the mounting face 92. A pilot pin 108 (see FIG. 6) is located between the lower pair of bolts 104 and is received in a pilot hole 110 provided in the mounting face 92 between the threaded holes 106. As considered in FIGS. 2 and 3, the valve body 96 contains four fore-and-aft extending valve bore arrangements (not visible) spaced vertically from each other and having opposite front and rear ends respectively closed by front and rear threaded plugs 111, these bore arrangements containing pressure responsive valve elements (not shown) which operate in a series progressive fashion, as is known in the art (see, for example, U.S. Pat. No. 5,810,115, granted 22 Sep. 1998), to distribute lubricant received by the valve 94 from the passage 90 to various lubrication points of the knotter arrangement 14, in a manner described below in further detail.

Referring now also to FIG. 4, it can be seen that the lubricant inlet passage 90 is coplanar with, and coupled to, the upper valve bore of the distribution valve 94 by way of a cross passage 112 which is provided in the knotter frame 24 so as to extend between the inlet passage 90 and the knotter frame valve mounting face 92, with the cross passage 112 being in register with an end of a lubricant inlet passage 114 provided in the valve body 96 so as to extend between the upper valve bore and the mounting face 98.

Associated with each knotter frame 24 is a lubricant distribution passage arrangement for routing lubricant discharged by the lubricant distribution valve 94 to various lubrication points at the respective interfaces between the sleeve 26 and hub 18, between the worm gear spindle 62 and its associated bore 61, between the knife arm shaft 44 and the bore 40, between the upper and lower parts of the billhook spindle 74 and of the upper and lower bore sections 71 and 72, respectively, and between the twine disk spindle 54 and bore 50. The lubricant distribution passage arrangement includes both distribution passages extending entirely internally of the frame 24 between the valve 94 and a respective lubrication point, and a plurality of distribution passages, each composed of intake and delivery passage segments, respectively coupled directly to the valve 94 and a given distribution point, and to each other by an external distribution line.

Specifically, with reference to FIG. 5, it can be seen that a knife arm shaft lubricant distribution passage 116 is provided entirely within the knotter frame 24 and extends between an upper front location of the valve mounting face 92 and a central location along the length of the knife arm shaft bore 40. The end of the passage 116 at the face 92 is in register with an upper front outlet passage 118 provided in the valve body 96 so as to extend between the upper valve bore arrangement and the mounting face 98. Also located entirely within the knotter frame 24 is an upper billhook spindle lubricant distribution passage 120 which extends between a front location of the valve mounting face 92 disposed vertically below the passage 116 and a central location between opposite ends of the upper section 71 of the mounting bore for the billhook spindle 74. The valve body 98 is provided with an outlet passage 122 having an end at the mounting face 98 which is in register with the end of the distribution passage 120 at the mounting face 92, the outlet passage 122 being connected to the second valve bore arrangement from the top of the valve body 96.

Considering FIGS. 2 and 4 together, a gear hub lubricant distribution passage is provided which comprises a gear hub lubricant distribution line 124, located exteriorly of the knotter frame 24 and having opposite ends respectively coupled, as by fittings 126 and 128, to a lubricant distribution intake passage segment 130 provided in an upper location of the frame leg 36 and a delivery passage segment 131 which extends vertically through the top of the sleeve 26. The mounting face 92 contains a cross passage 132 coupled to the intake passage segment 130 and being in register with an outlet passage 134 provided in the valve body 96.

A twine disk spindle lubricant distribution passage is provided which comprises a worm gear spindle lubricant distribution line 136 having opposite ends respectively coupled, as by fittings 138 and 140, to a lower lubricant intake passage segment 142, located in the frame leg 36 below the passage segment 130, and a delivery passage segment 144 extending to the worm gear spindle bore 61 from a location in a central rear surface of the rearward projection 60 of the right frame leg 34. The mounting face 92 contains a cross bore 146 coupled to the intake passage segment 142 and being in register with an outlet passage 148 provided in the valve body 96.

Considering now also FIGS. 3 and 5, a billhook spindle section lubricant distribution passage is provided which comprises a lower billhook spindle lubricant distribution line 150 having opposite ends respectively coupled, as by fittings 152 and 154, to an upper front intake passage segment 156, which is aligned with the upper rear intake passage segment 130, and to a delivery passage segment 158 extending through the forward projection 70 of the right frame leg 34. The mounting face 92 contains a cross passage 160 coupled to the intake passage segment 156 and being in register with an outlet passage 162 provided in the valve body 96.

A twine disk spindle lubricant distribution passage includes a twine disk spindle lubricant distribution line 164 having opposite ends respectively coupled, as by fittings 166 and 168, to a lower front lubricant intake passage segment 170, which is aligned with the lower rear passage segment 142, and to a delivery passage segment 171 extending vertically in the ring 49 to the twine disk spindle bore 50. A cross passage 172 extends between the intake passage segment 170 and the mounting face 92 and is in register with an outlet passage 174 provided in the valve body 96.

As stated above, the lubricant distribution valve 94 is preferably a series progressive divider valve containing valve elements (not shown) which operate, in response to pressure, to sequentially deliver lubricant to the two internal lubricant distribution passages 116 and 120 that extend directly through the knotter frame 24 respectively to the lubrication points for the knife arm shaft 44 and upper region of the billhook spindle 74, and to the four lubricant distribution intake passages 130, 142, 156 and 170 which are respectively coupled to first ends of the lubricant distribution lines 124, 136, 150 and 164 having respective second ends coupled to lubrication passages for lubricating the gear hub 18, the worm gear spindle 62, the lower region of the billhook spindle 74 and the twine disk spindle 54. Thus, it will be appreciated that the knotter frame 24 not only serves as a reservoir for lubricant but also serves as a manifold which distributes lubrication to each lubrication point of the knotter assembly 14.

Further, it will be appreciated that even though the distribution lines 124, 136, 150 and 164 are all located exteriorly of the knotter frame 24, they are rigid and move in concert with the frame when it is pivoted upwardly to a service position and, therefore, there is no possibility that the lines will become crimped or damaged as was the case with the prior art arrangement which utilized flexible lines leading from a secondary distribution block or manifold to each of the lubrication points of each knotter assembly.

Having described the preferred embodiment, it will become apparent that various modifications can be made without departing from the scope of the invention as defined in the accompanying claims.

The invention claimed is:

1. A combined knotter arrangement and lubrication system, comprising: said knotter arrangement including a knotter drive shaft, a plurality of knotter assemblies having respective drive gears provided with hubs received on, and mounted for rotation with said drive shaft at equally spaced locations along said shaft; each knotter assembly further including a knotter frame defining a cylindrical sleeve mounted to an associated one of said hubs for permitting rotation of said associated one of said hubs within said sleeve and thereby defining a first lubrication point at an interface between said sleeve and hub; at least a knife arm shaft, a worm gear spindle, a twine disk spindle and a billhook spindle being mounted for rotation within respective bores provided in said knotter frame and thereby defining second, third, fourth and fifth lubrication points, respectively, at the interfaces between said knife arm shaft, worm gear spindle, twine disk spindle and billhook spindle and their respective bores; said lubrication system including a primary distribution manifold; each knotter frame including a lubricant inlet passage; a distribution line coupled between said primary distribution manifold and each said inlet passage; a lubricant distribution valve including a valve body mounted to each said knotter frame and having a plurality of lubricant outlet passages for respectively supplying fluid to said first, second, third, fourth and fifty lubrication points; and a lubricant distribution passage arrangement including a lubrication distribution passage extending between each said lubricant outlet passage and a given one of said lubrication points.

2. The combined knotter arrangement and lubrication system defined in claim 1, wherein at least one of said lubricant distribution passages is located entirely within said knotter frame.

3. The combined knotter arrangement and lubrication system defined in claim 1, wherein at least two of said lubricant distribution passages are located entirely within said knotter frame.

4. The combined knotter arrangement and lubrication system, as defined in claim 1, wherein said lubricant distribution passages include at least one lubricant distribution passage comprising an intake passage segment coupled to one of said lubricant outlet passages of said valve body, a lubricant delivery passage segment located in said knotter frame and coupled to one of said lubricant delivery points, and a lubricant distribution line being located exteriorly of said knotter frame and having opposite ends respectively coupled to said intake passage segment and said delivery passage segment.

5. The combined knotter arrangement and lubrication system, as defined in claim 1, wherein said lubricant distribution passages include at least three lubricant distribution passages, with each lubricant distribution passages comprising a lubricant outlet passage coupled to a respective of said lubricant outlet passages of said valve body, a lubricant delivery passage segment located in said knotter frame and coupled to a respective one of said lubricant delivery points and a lubricant distribution line being located exteriorly of said knotter frame and having opposite ends respectively coupled to one of said intake passage segments, and to one of said delivery passage segments.

* * * * *